United States Patent
Biasiotto et al.

(10) Patent No.: US 6,955,249 B2
(45) Date of Patent: Oct. 18, 2005

(54) CONTROLLED OSCILLATING DAMPER

(75) Inventors: Marco Biasiotto, Turin (IT); Francesco Butera, Turin (IT); Stefano Alacqua, Cascine Vica (IT)

(73) Assignee: C.R.F. Societa Consortile per Azioni, Turin (IT)

( * ) Notice: Subject to any disclaimer, the term of this patent is extended or adjusted under 35 U.S.C. 154(b) by 0 days.

(21) Appl. No.: 10/927,478

(22) Filed: Aug. 27, 2004

(65) Prior Publication Data

US 2005/0103585 A1    May 19, 2005

(30) Foreign Application Priority Data

Nov. 14, 2003    (IT) .......................... TO2003A0907

(51) Int. Cl.[7] .................... F16D 57/00; F16D 57/02; F16F 9/14
(52) U.S. Cl. ................... 188/267.1; 188/267.2; 188/306; 188/290; 267/140.14
(58) Field of Search ............. 188/267, 267.1, 188/267.2, 322.5, 130, 290–310; 267/140.14, 267/140.15, 64.11; 482/903; 192/21.5; 16/51, 16/82, 54; 464/24, 29; 74/574

(56) References Cited

U.S. PATENT DOCUMENTS

| | | | |
|---|---|---|---|
| 1,500,138 A | 7/1924 | Le Maire | |
| 1,782,725 A | 11/1930 | Inman | |
| 2,064,496 A | 12/1936 | Gustav et al. | |
| 4,942,947 A | 7/1990 | Shtarkman | |
| 6,318,522 B1 * | 11/2001 | Johnston et al. | 188/267.2 |
| 2002/0125086 A1 | 9/2002 | Oliver et al. | |
| 2004/0007432 A1 * | 1/2004 | Biassiotto et al. | 188/306 |

FOREIGN PATENT DOCUMENTS

| | | | |
|---|---|---|---|
| EP | 1 070 872 A1 | | 1/2001 |
| EP | 1531283 A1 * | | 5/2005 |
| GB | 630829 A | | 11/1947 |
| JP | 8-177939 | * | 7/1996 |

* cited by examiner

Primary Examiner—Douglas C. Butler
(74) Attorney, Agent, or Firm—Sughrue Mion, PLLC

(57) ABSTRACT

Controlled oscillating damper, comprising: a housing (12) provided with a cavity (14), an oscillating element (18) moving sealingly within the cavity (14), in which the housing (12) and the oscillating element (18) have respective walls defining at least one chamber (44) filled with magneto-rheological or electro-rheological damping fluid, and at least one electrically controlled excitation device (46) equipped with at least one fluid passage (52) which a fluid flow gets through during the motion of the oscillating element (18). The excitation device (46) is stationary with respect to the housing (12) and is arranged so as to divide the damping chamber (44) into two sections of variable volume (44a, 44b) communicating one with the other through the passage (52).

6 Claims, 2 Drawing Sheets

CONTROLLED OSCILLATING DAMPER

BACKGROUND OF THE INVENTION

The present invention relates to a controlled oscillating damper according to the preamble of claim 1, which is known from document EP-A-1 070 872 of the same Applicant.

This document describes an oscillating damper comprising a housing defining a chamber filled with damping fluid, an oscillating plate moving inside said chamber and placed so as to divide the chamber into two sections of variable volume, and at least one passage created in the oscillating plate to enable the fluid to pass from one section to the other during the motion of said plate. The damping fluid is a magneto-rheological or electro-rheological fluid and an electrically controlled excitation device is arranged in the aforementioned passage in order to control the resistance of the fluid flow through said passage.

SUMMARY OF THE INVENTION

The present invention aims at providing a controlled oscillating damper as described above, which is simpler from a structural point of view, and which has a higher mechanical resistance and less fluid leaks around the oscillating plate.

According to the present invention, this aim is achieved by a controlled oscillating damper having the characteristics in accordance with the claims.

BRIEF DESCRIPTION OF THE DRAWINGS

The present invention shall now be described in detail with reference to the accompanying drawings, given as a mere non-limiting example, in which.

DETAILED DESCRIPTION OF THE INVENTION

Figure 1:
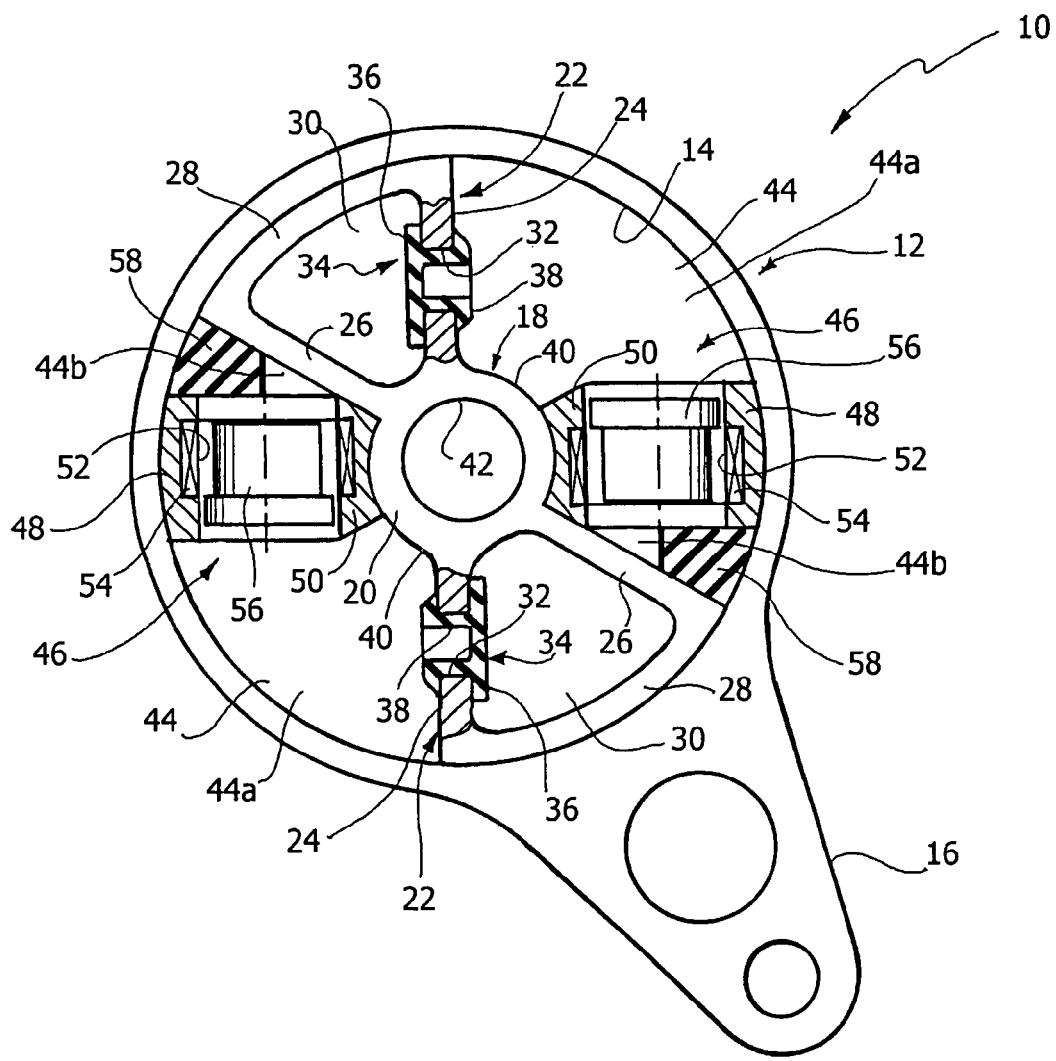
FIG. 1 is a schematic axial section of a controlled oscillating damper according to the present invention.

With reference to FIG. 1, number 10 refers to a controlled oscillating damper according to a first embodiment of the present invention. The oscillating damper 10 comprises a stationary housing 12, for instance made of metal, having a cavity 14 preferably with a cylindrical shape and a circular section. The housing 12 can be provided with a fastening flange 16 radially protruding from the outer surface of said housing 12.

An oscillating element 18 is housed inside the cavity 14 so as to rotate freely. The oscillating element 18, preferably made of metal, has a hub 20 mounted so as to rotate freely around an axis orthogonal to the plane of FIG. 1 and coaxial with respect to the axis of the cavity 14.

In the embodiment shown in FIG. 1, the oscillating element 18 has two integral portions 22 protruding in radial direction from the hub 20. Each of said two portions 22 has an angular extension of at least 60° and consists of two radial walls 24, 26 joined one to the other by a circumferential wall 28. In lateral direction the oscillating element is delimited by two lids (not shown) preferably made of plastic. Each portion 22 has a compensation chamber 30 comprising a cavity defined between the radial walls 24, 26 and the circumferential wall 28. The radial walls 24 of each portion 22 are provided with one or more through openings 32. A deformable element 34 is placed in each of said openings 32. Each deformable element 34 has a membrane-like portion 36 and an anchoring portion 38, the latter being inserted into the opening 32 and keeping the membrane-like element 36 in sealing contact with the inner surface of the radial wall 24.

The hub 20 of the oscillating element 18 has two cylindrical surfaces 40 extending between the portions 22. The hub 20 further has a cavity 42 within which a shaft (not shown) can be inserted and fastened, which shaft can be fastened to an oscillating component whose oscillating motion has to be damped.

The oscillating damper 10 shown in FIG. 1 comprises two damping chambers 44, each of them being delimited by two radial walls 24, 26, by the cylindrical surface 40 of the hub 20 extending between the walls 24, 26 and by the portion of the cylindrical surface of the cavity 14 extending between the radial walls 24, 26. The damping chambers 44 are delimited on their front side by two lids (not shown) fastened to the two ends of the housing 12. The lids of the oscillating element 18 are in contact—though not necessarily in sealing contact—with the lids of the housing.

The circumferential surfaces 28 of both portions 22 are in contact—though not necessarily in sealing contact—with the inner cylindrical surface of the cavity 14. The damping chambers 14 are liquid-sealingly insulated with respect to the outside, whereas between a chamber and the adjacent one sealing elements can be omitted since during operation possible leaks are of little relevance with respect to the total flow of shifted fluid, which is also due to the high viscosity of the fluids used. The two damping chambers 44 are filled with a magneto-rheological or electro-rheological fluid, i.e. a fluid that can vary its viscosity in the presence of an electric or magnetic field. The compensation chambers 30 created inside the portions 22 are filled with a gas, air for instance. Said compensation chambers 30 are sealingly insulated with respect to the damping chambers 44. The membrane-like portions 36 of the deformable elements 34 can deform when the difference between the pressure of the damping fluid inside the damping chambers 44 and the pressure of the gas inside the compensation chambers 30 varies.

The oscillating damper 10 comprises at least two electrically controlled excitation devices 46. Each excitation device 46 is stationary with respect to the housing 12 and extends inside a corresponding damping chamber 44. Each excitation device 46 divides its damping chamber 44 into two sections of variable volume 44a, 44b. Each excitation device 46 comprises a radially outer portion 48, which is in contact—though not necessarily in sealing contact—with the cylindrical surface of the cavity 14, and a radially inner portion 50, which is in contact—though not necessarily in sealing contact—with the cylindrical surface 40 of the hub 20.

Each excitation device 46 has a passage 52 that puts into communication the two sections of variable volume 44a, 44b of the corresponding damping chamber 44. Each excitation device 46 is further provided with an electric winding 54 generating an electric or magnetic field through the fluid passage 52. The electric windings 54 are electrically supplied by means of conductors (not shown) extending through the wall of the housing 12. Each excitation device 46 can further be equipped with a magnetic core 56 coaxial to the electric winding 54. In the disclosed example, the fluid passage 52 is created between the core 56 and the electric winding 54.

The electric or magnetic field generated by the excitation devices 48 locally modifies the damping properties of the magneto-rheological or electro-rheological fluid getting through the passage 52, thus varying the damping properties of the oscillating damper.

The rotary motion of the oscillating element 18 around its longitudinal axis causes a variation in the volume of the sections 44a, 44b of the damping chambers 44 and forces the damping fluid to get through the passages 52 of the excitation devices 46. The resistance of the fluid flow through the passages 52 can be adjusted by varying the intensity of the electric or magnetic field of the excitation devices 46.

During operation, the abrupt angular accelerations of the oscillating element 18 could result in cavitation phenomena in the damping fluid mass. The membrane-like portions 36 of the deformable elements 34 can deform as a result of the variations of pressure difference in the chambers 30, 44 and enable to avoid or limit cavitation phenomena. The membrane-like portions further allow to compensate volumetric variations due to liquid leaks towards the outside and to variations of operating temperature.

The shape of the oscillating element 18, with its portions 22 occupying part of the volume of the cavity 14, enables to reduce the amount of magneto-rheological or electro-rheological fluid and to obtain at the same time mechanical resistance, reduces fluid leaks between the chambers during operation and creates an air reserve for pressurization.

The oscillating damper 10 can further be equipped with stroke-end pads 58 fastened to the housing 12 or to the outer surfaces of the walls 26 of the oscillating element 18.

Figure 2:
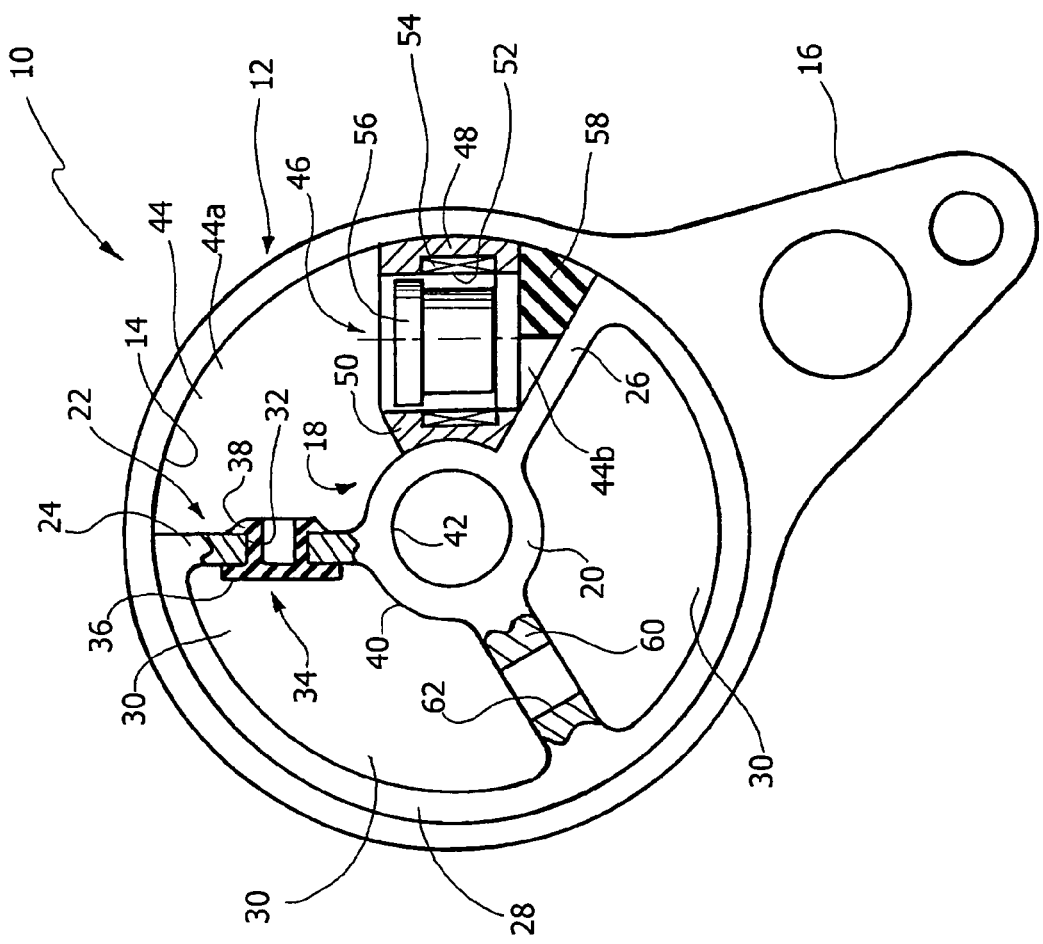
FIG. 2 is a schematic axial section of a variant of the damper according to the invention.

FIG. 2 shows a variant of the controlled oscillating damper according to the present invention. In FIG. 2 the elements corresponding to those previously described are assigned the same reference numbers. The variant of FIG. 2 comprises one damping chamber 44 and one excitation device 46. In the disclosed example, the damping chamber 44 has an angular extension of about 120° and the oscillating element 18 has one portion 22 with an angular extension of about 240°. The oscillating element 18 has two end radial walls 24, 26 delimiting in radial direction the damping chamber 44. The radial walls 24, 26 of the oscillating element 18 are joined one to the other by a circumferential wall 28. The oscillating element 18 can be provided with an intermediate radial wall 60 connecting the hub to the circumferential wall 28. The intermediate wall 60, if present, is preferably equipped with openings 62 putting into communication the two portions of the compensation chamber 30. This solution enables to obtain a high volume in the compensation chamber and is therefore particularly useful for eliminating cavitation phenomena. The solution of FIG. 2 is also advantageous from an economic point of view, since it requires the use of one excitation device 46 and a small volume of damping fluid.

Obviously, though the basic idea of the invention remains the same, construction details and embodiments can widely vary with respect to what has been described and shown here, however without leaving the framework of the invention, as defined in the claims that follow.

What is claimed is:

1. Controlled oscillating damper, comprising:
a housing provided with a cavity,
an oscillating element moving sealingly within said cavity, in which the housing and the oscillating element have respective walls defining at least one damping chamber filled with magneto-rheological or electro-rheological fluid, and
at least one electrically controlled excitation device equipped with at least one fluid passage which a fluid flow gets through during the motion of the oscillating element, the excitation device being designed to control the resistance of the fluid flow getting through said passage,
wherein the excitation device is stationary with respect to the housing and is arranged so as to divide said damping chamber into two sections of variable volume communicating one with the other through said passage and
wherein the oscillating element is provided with at least one compensation chamber filled with a gas and communicating with said damping chamber through at least one opening sealingly closed by a deformable element.

2. Oscillating damper according to claim 1, wherein the oscillating element comprises a hub from which extend at least two radial walls connected one to the other by at least one circumferential wall, the circumferential wall being in contact with the inner surface of the cavity of the housing, and the radial walls delimiting in radial direction said damping chamber and said compensation chamber.

3. Oscillating damper according to claim 1, wherein said excitation device comprises a radially outer portion in sealing contact with the inner surface of said cavity and a radially inner portion in contact with a cylindrical surface of a hub of the oscillating element.

4. Oscillating damper according to claim 1, comprising a magnetic core arranged coaxially to an electric winding, and wherein said passage extends between the magnetic core and the electric winding.

5. Oscillating damper according to claim 1, wherein the oscillating element comprises two portions, each of which is provided with a compensation chamber, the oscillating element being housed in a cavity with circular section divided into two damping chambers equipped with corresponding excitation devices.

6. Oscillating damper according to claim 1, wherein the oscillating element comprises only one portion provided with a compensation chamber and housed in a cavity with circular section so as to define one damping chamber equipped with one excitation device.

* * * * *